(12) United States Patent
Korst et al.

(10) Patent No.: US 11,880,547 B2
(45) Date of Patent: Jan. 23, 2024

(54) TWO-DIMENSIONAL EMBEDDING OF A HIERARCHICAL MENU FOR EASY NAVIGATION

(71) Applicant: KONINKLIJKE PHILIPS N.V., Eindhoven (NL)

(72) Inventors: Johannes Henricus Maria Korst, Eindhoven (NL); Mauro Barbieri, Eindhoven (NL); Serverius Petrus Paulus Pronk, Vught (NL); Marc André Peters, Veldhoven (NL); Qi Gao, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/779,215

(22) PCT Filed: Dec. 18, 2020

(86) PCT No.: PCT/EP2020/087335
§ 371 (c)(1),
(2) Date: May 24, 2022

(87) PCT Pub. No.: WO2021/123389
PCT Pub. Date: Jun. 24, 2021

(65) Prior Publication Data
US 2022/0413663 A1 Dec. 29, 2022

Related U.S. Application Data

(60) Provisional application No. 62/951,207, filed on Dec. 20, 2019.

(51) Int. Cl.
*G06F 3/0482* (2013.01)
*G06Q 30/0203* (2023.01)
*G06F 40/169* (2020.01)

(52) U.S. Cl.
CPC ....... *G06F 3/0482* (2013.01); *G06Q 30/0203* (2013.01); *G06F 40/169* (2020.01); *G06F 2203/04806* (2013.01)

(58) Field of Classification Search
CPC .................................................. G06F 3/048–05
See application file for complete search history.

(56) References Cited

U.S. PATENT DOCUMENTS 5,673,369 A 9/1997 Kim
6,334,192 B1 * 12/2001 Karpf ................... G09B 7/00
128/920

(Continued)

FOREIGN PATENT DOCUMENTS

CN 110019753 A 7/2019

OTHER PUBLICATIONS

International Search Report and Written Opinion dated Mar. 31, 2021 for International Application No. PCT/EP2020/087335 Filed Dec. 18, 2020.

(Continued)

*Primary Examiner* — Daniel Rodriguez (57) ABSTRACT

An apparatus (10) for navigating a hierarchical electronic questionnaire (12) includes at least one electronic processor (20) programmed to: provide (102) a user interface (UI) (27) via which: at least a portion of the hierarchical electronic questionnaire is presented on a display device (24) represented as a tree-based questionnaire map (30) with a plurality of nodes (32) connected by a plurality of branches (34), the nodes of the plurality of nodes corresponding to questions; a user input is received, via at least one user input device (22), indicative of a selection of at least one of the nodes; and the question corresponding to the selected node is displayed and a user input indicative of an answer to the question corresponding to the selected node is received via the at least one user input device; and populate (104) one or (Continued)

more nodes other than the selected node based on the selected node and/or the answer to the question corresponding to the selected node.

17 Claims, 3 Drawing Sheets

(56) References Cited

U.S. PATENT DOCUMENTS

| | | | | |
|---|---|---|---|---|
| 6,377,287 | B1* | 4/2002 | Hao | G06F 16/904 715/854 |
| 10,984,231 | B1* | 4/2021 | Vandivere | G06Q 50/163 |
| 2002/0032574 | A1* | 3/2002 | Lowrance | G06Q 10/06 706/14 |
| 2003/0050939 | A1* | 3/2003 | Dietz | G06F 40/194 707/999.203 |
| 2009/0287685 | A1* | 11/2009 | Charnock | G06F 16/38 707/999.005 |
| 2010/0047754 | A1* | 2/2010 | Metz, Jr. | G09B 7/00 434/322 |
| 2014/0058960 | A1* | 2/2014 | Porter | G06Q 40/00 705/311 |
| 2014/0288992 | A1 | 9/2014 | Wetzer | |
| 2015/0081685 | A1* | 3/2015 | Ashenfelter | G06F 16/9027 707/723 |
| 2017/0160878 | A1* | 6/2017 | Endo | A61B 5/7264 |
| 2017/0161370 | A1* | 6/2017 | Endo | G06F 16/338 |
| 2018/0039760 | A1* | 2/2018 | Armbruster | G16H 10/20 |
| 2018/0341870 | A1* | 11/2018 | Joshi | G06F 16/9027 |
| 2019/0114321 | A1 | 4/2019 | Lam | |
| 2020/0379951 | A1* | 12/2020 | Donaldson | G06F 16/17 |

OTHER PUBLICATIONS

Anonymous: "SteuerGo Benutzerhandbuch", 2018, pp. 1-51, Retrieved from the Internet: URL:http://docplayer.org/81102969-Benutzerhandbuch-steuergo-steuergo-so-funktioniert-die-steuererklaerung-mit-steuergo-benutzerhandbuch-moritz-musterfall.html.

SteuerGo, "Willkommen bei SteuerGo", Youtube, Oct. 21, 2019 (Oct. 21, 2019), p. 1 pp., XP054981566, Retrieved from the Internet: URL:https://www.youtube.com/watch?v=ODdbjYj PkWA.

FinanzNerd: "Elster ausfullen Anleitung-Steuererklarung Tutorial—Steuererklarung selber machen", Youtube, Apr. 29, 2017 (Apr. 29, 2017), p. 1 pp, XP054981567, Retrieved from the Internet: URL:https://www.youtube.com/watch?v=Mqp4X5 SA304.

Carey-Smith, et al: "An Adaptable Health Screening Questionnaire", 1993 IEEE.

* cited by examiner

TWO-DIMENSIONAL EMBEDDING OF A HIERARCHICAL MENU FOR EASY NAVIGATION

CROSS REFERENCE TO RELATED APPLICATIONS

This application is the U.S. National Phase application under 35 U.S.C. § 371 of International Application No. PCT/EP2020/087335 filed Dec. 18, 2020, which claims the benefit of U.S. Provisional Patent Application No. 62/951,207 filed Dec. 20, 2019. These applications are hereby incorporated by reference herein.

FIELD

The following relates generally to the electronic user interface arts, medical device maintenance arts, hierarchical questionnaire visualization arts, hierarchical questionnaire navigational arts, and related arts.

BACKGROUND

Known electronic user interfaces provide data entry dialogs for freeform and/or structured data entry. Structured data entry, in particular, advantageously constrains the user inputs to facilitate automated interpretation. Freeform data entry provides a flexible and unconstrained way to enter natural language text. In one common format, the electronic user interface provides a hierarchical electronic questionnaire. In this format, the user starts at a first question, and based on the answer other questions are presented. The user thereby "drills down" through the hierarchical electronic questionnaire. As an example of such a user interface, in equipment maintenance fields, such as medical imaging device maintenance, field service engineers (FSEs) are sent to hospitals or other medical imaging laboratories to perform preventative or remedial service on complex medical imaging devices such as magnetic resonance imaging (MM) scanners, computed tomography (CT) scanners, positron emission tomography (PET) scanners, fluoroscopy imagers, or so forth.

The FSEs have to document maintenance cases for various reasons. One of the reasons is that this documented information can be used to develop preventive maintenance methods that allow the replacements of parts near the end of their lifetime, before they are actually broken, such that unplanned downtime of medical imaging systems can be avoided. Another reason to document the maintenance cases to is provide a maintenance history for the imaging device, which may be referenced during subsequent service calls to that imaging device. Traditionally, FSEs used to document the answers of a number of obligatory questions related to patient safety and give further details in free text. This free text is generally difficult to analyze as different FSEs may use different wordings for the same symptoms and solutions and even use different languages.

It is therefore preferred that maintenance cases are documented by following a hierarchical, tree-structured menu (i.e., a hierarchical electronic questionnaire), that can be modelled as a rooted tree, consisting of a single track of main questions that have to be answered. Many of these questions can be answered by just selecting one of a pre-defined set of answers. Depending on the answer given to a main question, a side track of further questions may additionally have to be presented to the user, which in itself may again trigger additional side tracks, etc. Answering these questions in this way results in structured data that is much easier to analyze than free text.

However, experienced FSEs may find navigating through such a menu structure to reach the part of main interest to be inefficient, as it typically requires many mouse clicks and/or other user input operations to finally reach the questions that are most relevant for the issue at hand. By offering such a time-consuming approach, efficiency of these FSEs is reduced, and an FSE and may neglect to traverse a long series of questions in order to enter an isolated piece of relevant information.

The following discloses certain improvements to overcome these problems and others.

SUMMARY

In one aspect, an apparatus for navigating a hierarchical electronic questionnaire includes at least one electronic processor programmed to: provide a user interface (UI) via which: at least a portion of the hierarchical electronic questionnaire is presented on a display device represented as a tree-based questionnaire map with a plurality of nodes connected by a plurality of branches, the nodes of the plurality of nodes corresponding to questions; a user input is received, via at least one user input device, indicative of a selection of at least one of the nodes; and the question corresponding to the selected node is displayed and a user input indicative of an answer to the question corresponding to the selected node is received via the at least one user input device; and populate one or more nodes other than the selected node based on the selected node and/or the answer to the question corresponding to the selected node.

In another aspect, a non-transitory computer readable medium stores instructions executable by at least one electronic processor for performing a method of navigating a hierarchical electronic questionnaire. The method includes: providing a UI via which: at least a portion of the hierarchical electronic questionnaire is presented on a display device as a tree-based questionnaire map with a plurality of nodes connected by a plurality of branches, the nodes of the plurality of nodes corresponding to questions; a user input is received, via at least one user input device, indicative of a selection of at least one of the nodes and/or at least one of the branches; and the question corresponding to the selected node is displayed and a user input indicative of an answer to the question corresponding to the selected node or the selected branch is received via the at least one user input device; populating one or more nodes other than the selected node based on the selected node and/or the answer to the question corresponding to the selected node; and annotating one or more nodes or the nodes in one or more branches that require answers to the question represented by the nodes and cannot be populated with the answer to the selected node.

In another aspect, a method of navigating a hierarchical electronic questionnaire includes: providing a UI via which: at least a portion of the hierarchical electronic questionnaire is presented on a display device as a tree-based questionnaire map) comprising a two-dimensional (2D) map, the tree-based questionnaire map having a plurality of nodes connected by a plurality of branches that do not intersect each other, the nodes of the plurality of nodes corresponding to questions; a user input is received, via at least one user input device, indicative of a selection of at least one of the nodes; and the question corresponding to the selected node is displayed and a user input indicative of an answer to the question corresponding to the selected node is received via the at least one user input device; and populating one or more nodes other than the selected node based on the selected node and/or the answer to the question corresponding to the selected node.

One advantage resides in providing for more efficient navigation of a hierarchical questionnaire structure by displaying an overview of all or a portion of the questionnaire as a tree-based questionnaire map.

Another advantage resides in providing for more efficient navigation of a hierarchical questionnaire structure by displaying an overview a tree-based questionnaire map with selectable nodes and branches.

Another advantage resides in providing a hierarchical questionnaire structure displayed as a tree-based questionnaire map navigable by a user.

Another advantage resides in providing for more efficient navigation of a hierarchical questionnaire structure by auto-populating nodes or branches with answers provided to another node or branch.

Another advantage resides in providing for more efficient navigation of a hierarchical questionnaire structure by displaying an overview as a tree-based questionnaire map that can allow more experienced users to skip rudimentary questions while allowing less experienced users to answer more questions to learn the structure of the tree-based questionnaire map.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

The following relates to an improved user interface (UI) for hierarchical electronic questionnaires (HEQs). A HEQ presents questions following a tree-based structure. This approach provides significant advantages. The tree-based structure of the HEQ effectively guides the newer user to ensure that all pertinent questions are answered. The answers are more easily machine-readable (as compared with free-text entry), since answers are associated to specific questions of the tree. (Individual questions of the HEQ may present user dialogs allowing for free-text entry, thus still providing the flexibility of free-text entry where appropriate). Different questions can employ different user dialogs as appropriate to the information being requested (e.g. free-text dialog, drop-down list, radial button selectors, etc.). The approach can also require answers to certain questions before the HEQ can be saved, posted, or otherwise recorded, which also ensures that all required questions are answered. Still further, it can be efficient since irrelevant questions on side branches that are not traversed are never presented to the user.

However, tree-structured HEQs can have some disadvantages. One such disadvantage is that the user may need to answer a number of preliminary questions near the base of the tree before reaching the truly relevant questions. For example, if the user is addressing a problem with the patient support of an MIII system, the user may need to answer preliminary questions identifying the imaging modality and sub-systems to which the problem relates, before reaching a truly relevant question such as "Which mechanism of the patient support is malfunctioning?" For a newer user, this may actually be beneficial since it allows the newer user to learn the structure of the HEQ. However, a more experienced user may find this process of "drilling down" to reach the truly relevant questions annoying and inefficient.

In some embodiments, disclosed herein, an improved UI provides the user with a graphical map of the tree-structured HEQ, a portion or all of which can be displayed to the user. The questionnaire map represents questions as nodes, and displays as a two-dimensional (2D) map. An experienced user will come to recognize the layout of the 2D questionnaire map, and can directly click on a node to enter the tree-based hierarchy at a specific point. In the last example, the user may recognize the branch of the 2D questionnaire map that corresponds to work on the patient support, and so clicks on a node in that branch. On the other hand, a less experienced user may elect to not use the questionnaire map at all, or may elect to show only a portion of the questionnaire map. As an example of the latter, a toggle switch can be provided to switch between data entry mode and questionnaire map display mode, and the moderately experienced user in the process of data entry may switch to questionnaire map display mode to "see ahead" when working through a portion of the tree with which the user is already familiar.

While the ability to enter the hierarchical data entry at any point is beneficial from a user efficiency standpoint, it can introduce difficulties. One difficulty is that this allows for skipping questions. However, the answers to many of the skipped questions can be derived from the completed entries further down the tree. Again, using the previous example, if the user employs the questionnaire map to jump directly to the question: "Which mechanism of the patient support is malfunctioning?", then the earlier question: "Which sub-system is malfunctioning?" can be filled in with the answer "Patient support". Such auto population may also work laterally, e.g. if the same question node appears in different branches of the tree then entry of an answer for the question node can be auto-populated to the same question node in all other branches.

While such auto-population of earlier questions can often be done, not all skipped questions will be able to be auto-populated. In some instances, this may be inconsequential. However, it may be important to answer some skipped questions, e.g. to provide required substantive information, to provide terms that can be useful in subsequent keyword-based searching, or so forth. To address this, some questions can be designated in the HEQ as required questions, and the required questions can be highlighted in red in the displayed tree-based questionnaire map, and the questionnaire cannot be finalized and uploaded until all required questions are answered. Various other color, text, or symbol annotations can be added to the displayed tree-based questionnaire map, such as using different symbols for answered versus unanswered question nodes, labeling branches with semantic textual or symbolic labels, and so forth. In some cases, these annotations (and the underlying attributes assigned to questions of the HEQ) may evolve as the data entry proceeds, e.g. based on the answer to one question the set of required questions may change.

The 2D layout of the questionnaire map is preferably designed for ease of comprehension. The various branches of the 2D layout of the questionnaire map should be readily recognizable, preferably should not overlap (or should have limited overlap), and the whole 2D questionnaire map or portions thereof should fit on the display without being "zoomed out" to the point of becoming difficult to comprehend. One approach is to hand-craft the questionnaire map using a design GUI. However, for large questionnaires this could be tedious. The disclosed approach employs automatic generation of the 2D questionnaire map given the tree structure. Additionally, for larger questionnaire maps, the links between question nodes can be made shorter with increasing branch level, e.g. using a formula such as link length=$a^k$ where k is the branching level (with k=0 being the main track) and for a<1 the link length equals 1 for k=0 and decreases with increasing k. In this approach, a can have a small value when the entire questionnaire map is displayed, and a can be made larger as the user zooms in on a smaller region of the questionnaire map. In the limiting case of a=1 (suitable when the user has zoomed in significantly), every link of the displayed questionnaire map has link length=1. While examples of suitable approaches for 2D questionnaire map generation are provided herein, these are merely illustrative examples, and other approaches can be used.

Figure 1:
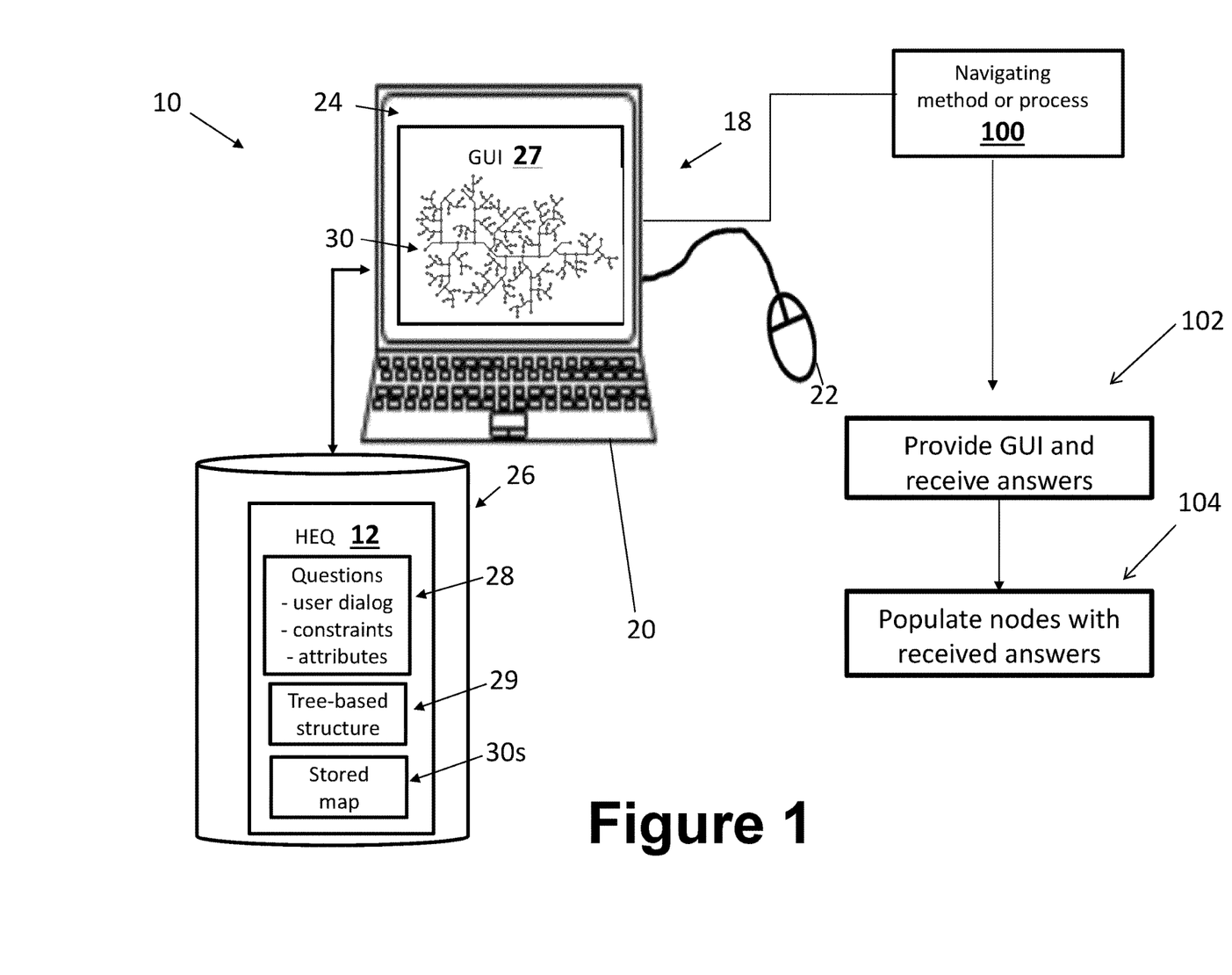
FIG. 1 diagrammatically illustrates an apparatus for navigating a hierarchical electronic questionnaire in accordance with the present disclosure.

With reference to FIG. 1, an illustrative apparatus 10 for navigating a hierarchical electronic questionnaire (HEQ) 12 is shown. FIG. 1 also shows an electronic processing device 18, such as a workstation computer, tablet computer, cellular telephone ("cellphone"), or more generally a computer. The disclosed HEQ data entry processing may be performed entirely by a local electronic processor, or a portion of the HEQ data entry processing may be performed by a remote electronic processor. In the latter case, the electronic processing device 18 is at least partially embodied as a server computer or a plurality of server computers, e.g. interconnected to form a server cluster, cloud computing resource, or so forth. The workstation 18 includes typical components, such as an electronic processor 20 (e.g., a microprocessor; again, in some embodiments part of the HEQ data entry processing may be performed by the microprocessor of a remote server or cloud computing resource), at least one user input device (e.g., a mouse, a keyboard, a trackball, touch-sensitive display, and/or the like) 22, and at least one display device 24 (e.g. an LCD display, plasma display, cathode ray tube display, and/or so forth, which optionally may be a touch-sensitive display thus also serving as a user input device). In some embodiments, the display device 24 can be a separate component from the workstation 18.

The electronic processor 20 is operatively connected with one or more non-transitory storage media 26 which stores the HEQ 12. The non-transitory storage media 26 may, by way of non-limiting illustrative example, include one or more of a magnetic disk, RAID, or other magnetic storage medium; a solid state drive, flash drive, electronically erasable read-only memory (EEROM) or other electronic memory; an optical disk or other optical storage; various combinations thereof; or so forth; and may be for example a network storage, an internal hard drive of the workstation 18, various combinations thereof, or so forth. It is to be understood that any reference to a non-transitory medium or media 26 herein is to be broadly construed as encompassing a single medium or multiple media of the same or different types. Likewise, the electronic processor 20 may be embodied as a single electronic processor or as two or more electronic processors. The non-transitory storage media 26 stores instructions executable by the at least one electronic processor 20. The instructions include instructions to generate a visualization of a graphical UI (GUI) 27 for display on the display device 24.

The HEQ 12 stored in the non-transitory storage media 26 includes a number of questions. The stored HEQ 12 includes information 28 for each question including a user dialog which is to be presented in order for the user to answer the question, and optionally other information such as constraints on the permissible answers and/or attributes of the question. By way of non-limiting illustrative example, the user dialog for a question may be substantially any type of GUI dialog, such as a drop-down list (in which case the stored information for the user dialog includes the elements of the drop-down list or links or pointers to this information), a radial selector (e.g., two radial selectors, one for "yes" and the other for "no", which are linked so that selecting one deselects the other), a checklist (where the stored information for the user dialog includes the elements of the checklist or links or pointers to this information), a free-form text entry user dialog, an integer or floating-value numerical value entry user dialog, or so forth. The optional constraints may, for example, be constraints on the range of permissible values in the case of a numerical value entry user dialog. The optional attributes may, for example, include an attribute indicating whether the question is a required question (this attribute might be updatable based on the answers provided to other questions), or so forth. The stored HEQ 12 also includes information defining a tree-based structure 29 of the HEQ 12, which indicates a tree-structured progression for presentation of the questions.

Figure 2:
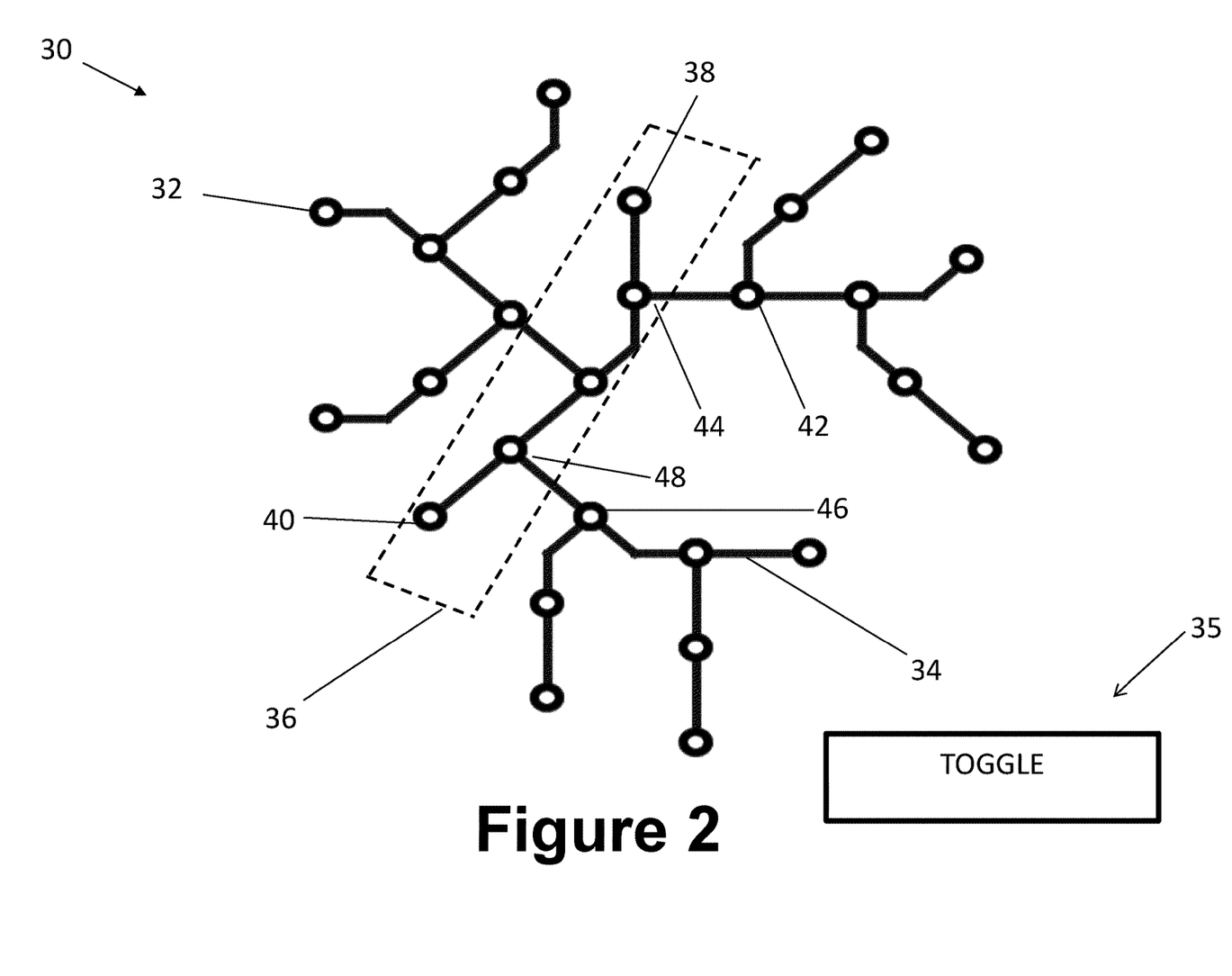
FIGS. 2 and 3 show examples of tree-based hierarchical electronic questionnaires used by the apparatus of FIG. 1.

With continuing reference to FIG. 1 and with further reference to FIG. 2, the HEQ 12 is presented on the display 24 as part of the GUI 27 display as a tree-based questionnaire map 30 comprising a 2D map. The information for rendering the questionnaire map 30 is suitably stored in the non-transitory storage 26 as part of the HEQ 12 as map information 30s. (Alternatively, the map information 30s may be stored separately from the HEQ 12 and linked therewith). The map information 30s can be retrieved from the non-transitory computer readable medium 26 and displayed on the display device 24 via the GUI 27 as a graphical visualization of the structure of the HEQ 12, that is, as the questionnaire map 30. As best seen in FIG. 2, the tree-based questionnaire map 30 includes a plurality of nodes 32 (represented as circles). The nodes 32 correspond to questions 28 in the HEQ 12 to be answered by the user. The nodes 32 are connected in the questionnaire map 30 by a plurality of branches 34 (represented in FIG. 2 as line segments), which graphically depict the tree-based structure 29 of the HEQ 12. As best seen in FIG. 2, the branches 34 preferably do not intersect each other (or, at most, intersect only minimally), which advantageously improves the readability of the tree-based questionnaire map 30.

The at least one electronic processor 20 is programmed to enable or allow the user to alter views of the tree-based questionnaire map 30 via the GUI 27. In one example, the user can zoom between presenting the entire tree-based structure 29 of the hierarchical electronic questionnaire 12 as the tree based questionnaire map 30 (i.e., fully zoomed out); and zooming in to present a portion (e.g., one or more nodes 32, one or more branches 34, and so forth) of the tree based structure 29 as the questionnaire map 30. Other illustrative user manipulations of the questionnaire map 30 may include panning left-right or panning up-down, adjusting the lengths of the links connecting the nodes 32, using a drop-and-drag boxing operation to select a portion of the questionnaire map 30 to be displayed (another way of implementing a zoom-in operation), or selecting a node 32 in order to bring up the user dialog for answering the corresponding question of the HEQ 12. The user manipulations may be done using typical GUI controls for manipulating a displayed graphical object, such as by scrolling or entering keystrokes with the at least one user input device 22. Typically, a more experienced user who understands or has previously worked with the HEQ 12 will be familiar with the questionnaire map 30 for the HEQ 12, and can select the portion of the HEQ relevant to case/questions the more experienced user is documenting. On the other hand, the entire questionnaire map 30 of the HEQ 12 can be presented to a less experienced user in order to help this less experienced user familiarize themselves with the tree-based questionnaire map 30.

In another example, upon receiving a user input via the at least one user input device 22, the at least one electronic processor 20 is programmed to adjust a length between branches 34 on the 2D map as the 2D map increases in size on the GUI 27 according to an original length of the branches and an exponential branching level (e.g., using a formula link length=$a^k$ where k is the branching level (with k=0 being the main track) and for a<1 the link length equals 1 for the main branch, k=0, and decreases with increasing k). In this approach, a can have a small value when the entire questionnaire map is displayed so that the more distal ends of the branches are visualized in a more compact manner compared with regions on or near the top level, and a can be made larger as the user zooms in on a smaller region of the questionnaire map to reduce this effect (which is less valuable at more zoomed-in views since the portion of the questionnaire map being displayed is smaller). In the limiting case of a=1 (suitable when the user has zoomed in significantly), every link of the displayed questionnaire map has link length=1 regardless of the branching level. In further examples, the GUI 27 can include a toggle switch 35 selectable via the at least one user input device 22 to switch the GUI between presenting the HEQ 12 as the tree-based structure 30 and presenting a field on the GUI 27 for displaying questions and providing answers to the questions corresponding to the nodes 34. In another, not necessarily mutually exclusive, approach, the user can click on a node 32 (e.g. using a mouse pointer, or equivalently touching the node using a touch-sensitive display) to bring up the user dialog on the GUI 27 for displaying the questions and providing the answer to the question corresponding to the selected (i.e. clicked-on) node 34.

To facilitate users in gaining familiarization with the questionnaire map 30 by way of repeated usage, the questionnaire map 30 (and hence the corresponding stored map 30s) are preferably static. In other words, while the questionnaire map 30 may be automatically generated for the HEQ 12 (as per examples described herein), the questionnaire map 30 is preferably generated once for the HEQ 12 and thereafter the same generated questionnaire map 30 is always presented to users of the HEQ 12. There may be exceptions to the preferably static nature of the questionnaire map 30—for example, questions may be added or removed from the HEQ 12, and/or the underlying tree-based structure 29 of the HEQ 12 may be updated, in which case the questionnaire map 30 (and underlying stored map 30s) may be updated accordingly.

Moreover, where there are a set of similar HEQs, the corresponding questionnaire maps are preferably structured similarly. As an example of this, in the medical imaging systems servicing context, there may be a number of different models of different MRI scanners, with each model having a corresponding HEQ for FSEs to fill out which is tailored to the specific hardware and software of that MRI scanner model. However, the HEQs for these different MRI scanner models will likely have a high degree of similarity as there is likely to be substantial overlap in terms of shared systems and subsystems, or at least similarity in the systems/subsystems. Hence, it is preferable that the corresponding questionnaire maps 30 be similar to the extent this is feasible. Again, this facilitates users (here FSEs) in gaining familiarity with the (beneficially similar) questionnaire maps of the various MRI scanner models.

With continuing reference to FIG. 2, and referring again to FIG. 1, the at least one electronic processor 20 is configured as described above to perform a method or process 100 for navigating the HEQ 12. The non-transitory storage medium 26 stores instructions which are readable and executable by the at least one electronic processor 20 to perform disclosed operations including performing the method or process 100. In some examples, the method 100 may be performed at least in part by cloud processing.

In FIG. 1, an illustrative embodiment of method 100 is diagrammatically shown as a flowchart. At an operation 102, the at least one electronic processor 20 is programmed to provide the GUI 27 on the display device 24. The tree-based questionnaire map 30 is presented to the user via the GUI 27. One or more user inputs can be received, via the at least one user input device 22, that are indicative of a selection of at least one of the nodes 32 (e.g., to answer the question represented by the selected node(s)). The question corresponding to the selected node 32 is displayed via the GUI 27, and the user inputs a user input indicative of an answer to the question (e.g., selecting options or entering keystrokes with the at least one user input device 22) corresponding to the selected node. For example, the user can select a node 32 corresponding to the question of "Which mechanism of the patient support is malfunctioning?" and enter an answer of "patient support."

In an operation 104, the at least one electronic processor 20 is programmed to populate one or more nodes 32 other than the selected node based on the selected node and/or the answer to the question corresponding to the selected node. Again, using the previous example, if the user jumps directly to a question: "Which mechanism of the patient support is malfunctioning?", then the earlier question of: "Which subsystem is malfunctioning?" can be filled in with the answer "patient support". Such auto population may also work laterally, e.g. if the same question node 32 appears in different branches 34 of the tree-based questionnaire map 30, then entry of an answer for the question node can be auto-populated to the same question node in all other branches.

In some examples, the nodes 32 and/or branches 34 may not be able to be auto-populated based on the answers provided by the user to the selected node or branch. Again, using the example of "patient support", this answer may not be suitable to auto-populate nodes 32 and/or branches 34 related to other matters (e.g., "What is the detector resolution?"). In this case, the nodes 32 and/or branches 34 corresponding to, for example, detector information, can be annotated to indicate that these nodes/branches cannot be populated with the answer to the selected node (i.e., the user must provide answers to the annotated nodes). Examples of such annotations can include, altering a color, shade, and/or cross-hatching of the nodes that require answers; providing a textual message on the GUI 27 annotating the nodes 32 or branches 34 that require answers, and so forth.

In the following, some non-limiting illustrative examples are provided for some suitable topologies of the questionnaire map 30. It is to be understood that these are merely illustrative examples, and that other topologies for the questionnaire map are contemplated.

Referring back to FIG. 2, the branches 34 of the illustrative tree-based questionnaire map 30 comprises only horizontal, vertical, and diagonal line segments to connect the nodes 32, thus providing an aesthetically pleasing visualization. A selected track of questions is indicated at 36, with a starting node 38 and an ending node 40. The starting node 38 and the ending node 40 are used for navigation and/or orientation purposes of the tree-based questionnaire map 30, and are not linked to questions themselves. As shown in FIG. 2, the track of questions 36 includes five nodes 32. Answers provided to three of the nodes in the track of questions 36 can be used to populate the other nodes in the tree-based questionnaire map 30 (e.g., an answer to the second node in the track can be used to populate the answers to the nodes to the branching 34 off-shooting from that node). For example, again using the example of the question: "Which mechanism of the patient support is malfunctioning?" (represented in FIG. 2 with a node 42), then the earlier question: "Which sub-system is malfunctioning?" (represented in FIG. 2 with a node 44 in the track 36) can be filled in with the answer "patient support". Such auto population may also work laterally, e.g. if the same question node 32 appears in different branches 34 of the tree-based questionnaire map 30, then entry of an answer for the question node can be auto-populated to the same question node in all other branches. Once this auto-population occurs for the node 44, the user can navigate the tree-based questionnaire map 30 to a node representative of the question "What is the detector resolution?" (represented in FIG. 2 as a node 46) that can answer the earlier question "Are there any detector malfunctions?" (represented in FIG. 2 as a node 48).

In the illustrative questionnaire map 30, the nodes 32 are defined as either male or female, where female nodes are only visited by horizontal or vertical line segments and male nodes by diagonal line segments (with an angle of plus or minus 45 degrees). In addition, the distances between the illustrative nodes 32 (e.g., the branches 34) are evenly distributed. The distance between nodes 32 on the track of questions 36 can be equal to 1 (e.g., the main track is on level 0, its side tracks on level 1, the side tracks of these side tracks on level 2, etc. In FIG. 2, the main track, i.e., the track of questions 36, on level 0, three tracks on level 1 and six tracks on level 2). The distance between two successive nodes on a track level k can be set as $a^k$, for $a \in R$ chosen in the interval (0,1]. For $a=1$, the unit distances between successive nodes for the tracks on all levels. FIG. 2 shows an example where a is chosen equal to one. For $a<1$, the side tracks require less space, such that the embedding can be drawn without crossing lines with a larger probability. This is especially relevant for large menu trees.

By assigning a randomly chosen gender to a node, a nice variation of male and female nodes 32 in the tree-based questionnaire map 30. Between two successive nodes of different gender, there is a change of direction in the line segments constituting the track of questions 36. For example, in FIG. 2, the orientation of the start node of the main track is South (S), as is the orientation of the next node. As the subsequent node is male, the orientation must be changed to either South-East (SE) or South-West (SW). As shown in FIG. 2, SW is chosen.

The location of the start node of a side track coincides with the location of the corresponding question node on the main track, but the orientation can be chosen to be perpendicular. For example, the first question node 44 has orientation S. The start node of the corresponding side track must be given a perpendicular orientation, i.e. it should either be West (W) or East (E). In this case, E is chosen. Both nodes are located on the same location. The point where the track and the side track meet is called a T-junction. Based on this, aesthetically pleasing visualizations between two successive nodes 32 of different genders with a track change of an angle of plus or minus 135 degrees (e.g., an angle point) is provided, and an orientation between a track and a side track being perpendicular at a corresponding T-junction.

As shown in FIG. 2, there are 9 so-called angle-points with angles of plus or minus 135 degrees, in addition to 9 T-junctions. For each angle-points and each T-junction, the visualization can be rotated left or right. For an angle-point, the tree-based questionnaire map 30 can be turned with an angle of plus or minus 135 degrees. For a T-junction, the tree-based questionnaire map 30 can be turned an angle of plus or minus 90 degrees. Hence, this gives a total number of embeddings of $2^{((8+9))}=131,072$. In general, this includes, with a large probability, embeddings for which the line segments do not cross. FIG. 2 shows an example of embedding without crossing line segments.

The construction of the questionnaire map 30 given the tree-based structure 29 of the HEQ 12 can be done in various ways. One approach is to construct the questionnaire map 30 manually, for example, following the guidelines given above. For a larger HEQ 12, at least an initial layout of the questionnaire map 30 may be automatically generated using an iterative process that starts with laying down a node representing the starting node 38 on the main track, and then iteratively adds nodes for successive questions following the tree-based structure 29 of the HEQ 12. As each branch of the tree-based structure 29 is encountered, it is followed to add the nodes for that branch. As nodes are added, the orientations of the links are chosen using the rules given above to avoid overlaps where possible, for example by flipping an angle edge or a T-junction. The automatic adding of nodes preferably employs random (or other stochastic) selection of flip angles within the selection rules. If an overlap is unavoidable, then the portion of the initial layout proximate to the overlap may be deleted and re-added, which may provide a different (non-overlapping) result based on the (generally different) randomly selected flip angles. If the overlap occurs after several such restarts, then it is allowed, but is highlighted in the rendering of the final initial layout. Manual adjustments can then be made to the initial layout to reduce or eliminate any overlaps in the initial layout, and/or for other purposes such as to improve the aesthetic appeal of the final questionnaire map 30, or to provide additional space in areas representing branches to which it is anticipated that additional questions may be added, or so forth.

Figure 3:
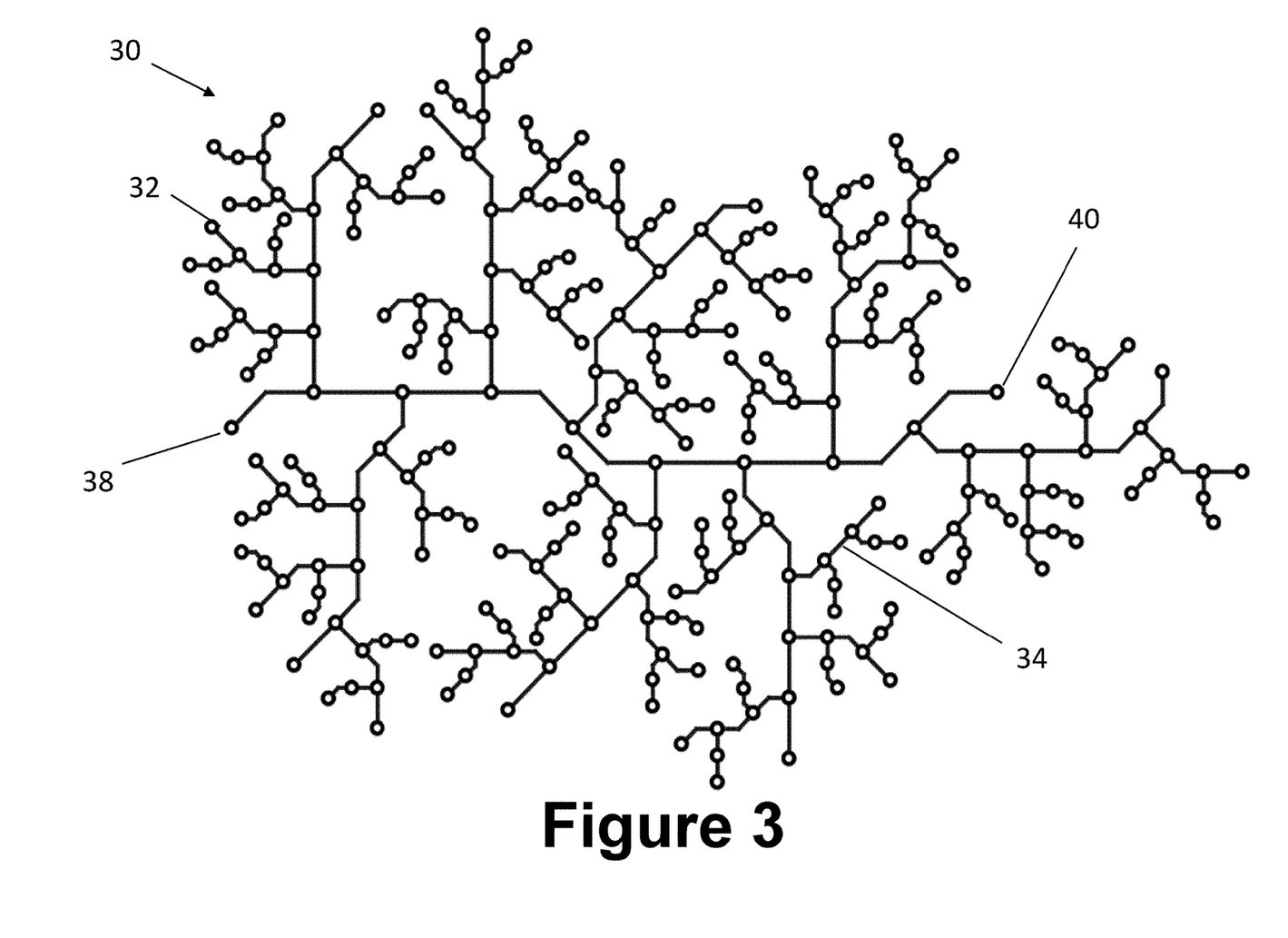

FIG. 3 shows an example of a larger (or more zoomed out) tree-based questionnaire map 30. For larger (or zoomed out) tree-based questionnaire map 30, a value for a that is smaller than one is selected to increase the probability that embeddings can be constructed without crossing line segments. The tree-based questionnaire map 30 shown in FIG. 3 is selected with $a=0.7$. For a moderately experienced FSE, this embedding may not be shown completely. The moderately experienced FSE can select the tree-based questionnaire map 30 to only show the parts visited frequently. The visualized portion of the tree-based questionnaire map 30 selected at the start of a documentation session may be set by the FSE by interactively switching subtrees 'on' or 'off'. These settings can be saved for later use.

In some examples, the tracks of questions can be given a specific color, such that the main track 36 is more easily recognized. Additionally, when sufficiently zoomed in, the nodes 32 can show a small logo inside the circle that is now drawn to further improve navigation. If desired, a zoomed-out version could hide the tracks of a relatively high level. By zooming in, these tracks of higher levels would then be shown. Furthermore, additional information on the individual nodes or tracks could be shown when hovering over them.

The choice of embedding is considered a preferred embodiment. Alternative embeddings can be constructed, for example only using horizontal and vertical tracks, where the main track runs vertically, its side tracks horizontally, etc. However, this reduces the degrees of freedom to draw the embedding and consequently increases the probability that no embedding can be constructed without crossing branches 34.

The disclosure has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. An apparatus for navigating a hierarchical electronic questionnaire, the apparatus comprising at least one electronic processor programmed to:
provide a user interface (UI) via which:
at least a portion of the hierarchical electronic questionnaire is presented on a display device represented as a tree-based questionnaire map with a plurality of nodes connected by a plurality of branches, the nodes of the plurality of nodes corresponding to questions;
a user input is received, via at least one user input device, indicative of a selection of at least one of the nodes; and
the question corresponding to the selected node is displayed and a user input indicative of an answer to the question corresponding to the selected node is received via the at least one user input device; and
populate one or more nodes other than the selected node based on the selected node and/or the answer to the question corresponding to the selected node, wherein the populating includes populating one or more nodes in branches of the tree-based questionnaire map other than a branch containing the selected node with the answer to the question corresponding to the selected node.

2. The apparatus of claim 1, wherein the at least one electronic processor is programmed to:
annotate one or more nodes that require answers to the question represented by the nodes and cannot be populated with the answer to the selected node.

3. The apparatus of claim 2, wherein the at least one electronic processor is programmed to annotate the one or more nodes that require answers to the question represented by the nodes and cannot be populated with the answer to the selected node by at least one of:
altering one or more of a color, shade, and cross-hatching of the nodes that require answers; and
providing a textual message annotating the nodes that require answers.

4. The apparatus of claim 1, wherein the at least one electronic processor is programmed to:
annotate one or more nodes in branches that require answers to the question represented by the nodes and cannot be populated based on the selected node or the answer to the question corresponding to the selected node.

5. The apparatus of claim 4, wherein the at least one electronic processor is programmed to annotate the one or more nodes in branches that require answers to the question represented by the nodes and cannot be populated with the answer to the selected node by at least one of:
altering one or more of a color, shade, and cross-hatching of the nodes that require answers; and
providing a textual message annotating the nodes that require answers.

6. The apparatus of claim 1, wherein the at least one electronic processor is programmed to enable the user to zoom between presenting the entire hierarchical electronic questionnaire as the tree based questionnaire map and presenting a portion of the hierarchical electronic questionnaire as the tree based questionnaire map.

7. The apparatus of claim 6, wherein the UI includes a toggle switch selectable via the at least one user input device to switch the UI between presenting the hierarchical electronic questionnaire as the tree-based questionnaire map and presenting a field on the UI for providing answers to the questions corresponding to the nodes.

8. The apparatus of claim 1, wherein the hierarchical electronic questionnaire is presented as the tree-based questionnaire map comprising a two-dimensional (2D) map.

9. The apparatus of claim 8, wherein the branches in the 2D map do not intersect each other.

10. The apparatus of claim 8, wherein the at least one electronic processor is programmed to:
adjust a length of the branches on the 2D map as the 2D map increases in size on the UI.

11. The apparatus of claim 10, wherein the at least one electronic processor is programmed to adjust the length between branches on the 2D map as the 2D map increases in size on the UI according to an original length of the branches and an exponential branching level.

12. A non-transitory computer readable medium storing instructions executable by at least one electronic processor for performing a method of navigating a hierarchical electronic questionnaire, the method comprising:
providing a user interface (UI) via which:
at least a portion of the hierarchical electronic questionnaire is presented on a display device as a tree-based questionnaire map with a plurality of nodes connected by a plurality of branches, the nodes of the plurality of nodes corresponding to questions;
a user input is received, via at least one user input device, indicative of a selection of at least one of the nodes and/or at least one of the branches; and
the question corresponding to the selected node is displayed and a user input indicative of an answer to the question corresponding to the selected node or the selected branch is received via the at least one user input device;
populating one or more nodes other than the selected node based on the selected node and/or the answer to the question corresponding to the selected node, wherein the populating includes populating one or more nodes in branches of the tree-based questionnaire map other than a branch containing the selected node with the answer to the question corresponding to the selected node; and annotating one or more nodes or the nodes in one or more branches that require answers to the question represented by the nodes and cannot be populated with the answer to the selected node.

13. The non-transitory computer readable medium of claim 12, wherein the method includes annotating the one or more nodes nodes or the nodes in one or more branches that require answers to the question represented by the nodes and cannot be populated with the answer to the selected node by at least one of:

alerting one or more of a color, shade, and cross-hatching of the nodes that require answers; and providing a textual message annotating the nodes that require answers.

14. The non-transitory computer readable medium of claim 12, wherein the method includes:

enabling the user to zoom between presenting the entire hierarchical electronic questionnaire as the tree based questionnaire map and presenting a portion of the hierarchical electronic questionnaire as the tree based questionnaire map.

15. The non-transitory computer readable medium of claim 12, wherein the method includes:

presenting the hierarchical electronic questionnaire as the tree-based questionnaire map comprising a two-dimensional (2D) map.

16. The non-transitory computer readable medium of claim 15, wherein the branches in the 2D map do not intersect each other.

17. A method of navigating a hierarchical electronic questionnaire, the method comprising:

providing a user interface (UI) via which:

at least a portion of the hierarchical electronic questionnaire is presented on a display device as a tree-based questionnaire map comprising a two-dimensional (2D) map, the tree-based questionnaire map having a plurality of nodes connected by a plurality of branches that do not intersect each other, the nodes of the plurality of nodes corresponding to questions;

a user input is received, via at least one user input device, indicative of a selection of at least one of the nodes; and the question corresponding to the selected node is displayed and a user input indicative of an answer to the question corresponding to the selected node is received via the at least one user input device;

populating one or more nodes other than the selected node based on the selected node and/or the answer to the question corresponding to the selected node;

adjusting, via an input received via the at least one user input device, a length of the branches on the 2D map as the 2D map increases in size on the UI; and adjusting, via an input received via the at least one user input device, the length between branches on the 2D map as the 2D map increases in size on the UI according to an original length of the branches and an exponential branching level.

\* \* \* \* \*